United States Patent [19]

Britton, Jr.

[11] Patent Number: 5,024,700
[45] Date of Patent: Jun. 18, 1991

[54] THIXOTROPIC PRINTING INK COMPOSITIONS AND METHODS OF PREPARING SAME

[75] Inventor: William E. Britton, Jr., Sacramento, Calif.

[73] Assignee: The Ink Company, W. Sacramento, Calif.

[21] Appl. No.: 403,687

[22] Filed: Sep. 5, 1989

[51] Int. Cl.$^5$ .............................. C09D 11/02
[52] U.S. Cl. ........................ 106/32; 106/20; 106/23; 106/30
[58] Field of Search ............... 106/32, 30, 23, 20

[56] References Cited

U.S. PATENT DOCUMENTS

| | | | |
|---|---|---|---|
| 2,996,396 | 8/1961 | Schroeder et al. | 106/252 |
| 3,096,193 | 7/1963 | Tinker et al. | 106/287 |
| 3,249,448 | 5/1966 | Coburn et al. | 106/32 |
| 3,330,673 | 7/1967 | Voet et al. | 106/32 |
| 3,391,081 | 7/1968 | Conrady | 106/32 |
| 3,468,829 | 9/1969 | Yoshioka et al. | 106/32 |
| 3,723,148 | 3/1973 | Tupper | 106/287 PR |
| 3,847,623 | 11/1974 | Mills et al. | 106/32 |
| 4,101,329 | 7/1978 | Loock | 106/22 |
| 4,101,480 | 7/1978 | Ruf | 260/23 |
| 4,357,164 | 11/1982 | Tsuji et al. | 106/32 |
| 4,391,637 | 7/1983 | Mardis et al. | 106/20 |
| 4,410,364 | 10/1983 | Finlayson et al. | 106/20 |
| 4,475,950 | 10/1984 | Finlayson | 106/20 |
| 4,654,081 | 3/1987 | Daizell | 106/23 |
| 4,666,519 | 5/1987 | Akiyama et al. | 106/22 |
| 4,683,002 | 7/1987 | Mirua et al. | 106/20 |
| 4,704,163 | 11/1987 | Baratto et al. | 106/20 |
| 4,726,844 | 2/1988 | Greenwood | 106/22 |
| 4,738,721 | 4/1988 | Baxter et al. | 106/22 |
| 4,752,381 | 6/1988 | Ferguson et al. | 106/32 |
| 4,786,327 | 11/1988 | Wenzel et al. | 106/22 |
| 4,797,157 | 1/1989 | Dilling et al. | 106/20 |

*Primary Examiner*—Mark L. Bell
*Assistant Examiner*—Helene Klemanski
*Attorney, Agent, or Firm*—Stetina and Brunda

[57] ABSTRACT

A method of imparting thixotropic properties to printing ink compositions comprising blending at least one ethanolamine compound into a printing ink composition at sufficient concentration to obtain a final printing ink material exhibiting desired thixotropic properties. The ethanolamine compounds usable in connection with the present invention include monoethanolamine, diethanolamine and triethanolamine. In at least one naphthenic ink oil based printing ink composition, desirable thixotropic properties are exhibited when TEA is added at levels varying between 0.5 and 2.0 percent by weight. The optimal amount of TEA in such naphthenic oil based ink composition is approximately 0.7 percent by weight. Ink formulations in accordance with the present invention may be based on organic ink vehicles including naphthenic ink oils and/or hydrocarbon resins. In at least some of the ink compositions of the present invention, the presence of the ethanolamine thixotropic agent also improves the rub resistance of the final ink.

18 Claims, No Drawings

THIXOTROPIC PRINTING INK COMPOSITIONS AND METHODS OF PREPARING SAME

BACKGROUND OF THE INVENTION

The present invention relates generally to the chemical arts and more particularly to thixotropic oil and/or resin-based ink compositions and methods of preparing same.

Various printing ink compositions have heretofore included thixotropic chemical compounds and/or organophilic clay gelant materials for purposes of imparting desired thixotropic properties to the ink. However, many chemical compounds used as thixotropic agents of the prior art require the application of substantial heat in order to obtain the desired rheological properties. Additionally, clay-type thixotropic agents tend to swell as they absorb oil and, because clay thixotropic agents are generally prepared in powder form, they often require vigorous mixing in order to obtain a final smooth ink composition. Such clay-type thixotropic agents also greatly reduce the gloss of certain heatset inks.

Accordingly, there exists a need in the art for improved thixotropic agents for use in organic-based (e.g. oil-based, resin-based) ink systems. It is desirable that such improved thixotropic agents be easily misable or dissolvable in organic ink vehicles. Additionally, it is desirable that such improved thixotropic agents be usable at room temperature or at normal ink manufacturing/processing temperatures without the necessity of increasing such temperatures to gain effective thixotropic effects. Furthermore, any such thixotropic agents should not diminish or detract from any desirable physical, chemical, and visual properties of the ink compositions in which they are incorporated.

SUMMARY OF THE INVENTION

The present invention overcomes some or all of the shortcomings of the prior art by identifying and providing new thixotropic agents for use in organic based (e.g. oil based and/or resin based) printing ink compositions. The new thixotropic agents of the present invention offer the advantage of being usable at room temperature and/or normal processing temperatures and also have been found to bring about desirable improvement in the rub resistance of certain printing inks.

In general, the printing ink compositions of the present invention comprise (a) at least one organic ink vehicle, (b) at least one ethanolamine compound, and (c) at least one color-imparting material, such as a pigment. The ethanolamine compound(s) is/are combined with the organic ink vehicle and pigment in sufficient concentration to provide a composition which exhibits desirable thixotropic properties as well as physical, chemical, and visual/color characteristics suited to the intended application.

The organic ink vehicles usable in ink compositions of the present invention include various (a) ink oils and (b) organic resins and/or combinations thereof.

Examples of ink oils which are preferably used in the present invention include naphthenic ink oils. One presently preferred naphthenic ink oil which is usable in the present invention is commercially available as Hyprint L-1200 (Ergon Refining, Vicksburg, Miss.) and has an average molecular weight of about 442 gm/mol. The carbon atom breakdown of this presently preferred naphthenic ink oil is as follows:

12% aromatic carbon atoms
40% naphthenic carbon atoms
48% paraffinic carbon atoms Examples of organic resins which may be used in the present invention include various high and low molecular weight resins. Generally, it is desirable to employ a resin, or combination of resins, which will result in a final ink formulation exhibiting a maximum water takeup of 40%–60% by weight. In particular, it has been found that an acceptable organic resin vehicle may be formed by combining one high molecular weight hydrocarbon resin having an average molecular weight of approximately 20,000–35,000 gm/mol (HSLM Resin, Resinol Corp., Hattiesburg, Miss.), with one lower molecular weight resin, such as resin having an average molecular weight of approximately 950 gm/mol (1420 Resin, Nevile Chemical Co., Pittsburg, Pa.). The relative amounts of these two resins are then adjusted so as to provide a final ink having the desired 40%–60% hydroscopicity.

One of the preferred resin compositions for use in connection with the present invention is known to be prepared from (a) tall oil fractions, (b) unsaturated hydrocarbon resin, (c) dienophile modified polymer, and (d) pentaerythritol (HSLM Resin, Resinol Corp., Hattiesburg, Miss.). Other resin compositions are, of course, also usable in connection With this invention.

The ethanolamine thixotropic agents which may be used in the present invention include monoethanolamine, diethanolamine, and/or triethanolamine. Of these, triethanolamine is presently preferred for use as a thixotropic additive in oil and/or resin-based printing ink compositions. In addition to their ability to impart desirable rehological properties, the inclusion of ethanolamine compounds, such as TEA, within the ink compositions of the present invention has been found to bring about improved rub resistance of the applied printing ink. Such improvement in rub resistance is identified as an additional advantage to be gained by incorporating the ethanolamine compounds of the present invention into ink compositions used in applications wherein rub-off is a typical problem (e.g., newspaper printing applications).

The color-imparting additives employable in ink compositions of the present invention include various pigments and/or pigment-containing pastes. Pre-dispursed pigment pastes generally comprise one or more colored pigments dispursed in a vehicle and/or solvent. The vehicle(s) employed in such pre-dispursed pigment paste may comprise one or more of the organic ink vehicles described herein as basic components of ink compositions of the present invention and/or other vehicles which differ from the above-described organic ink vehicles.

The printing ink compositions of the present invention may be prepared at room temperature without the addition of extraneous heat. Such printing ink compositions are known to exhibit desirable thixotropy as Well as increased rub resistance. It is probable that these compositions will also exhibit other improved properties and advantages. Indeed, additional other objects and advantages of the invention may become apparent :o those skilled in the art upon reading and understanding of the various examples and data set forth herein.

EXAMPLES

The following examples are provided for purposes of describing and illustrating the present invention. These examples represent ink compositions (i.e. ingredients and relative amounts thereof) which may be prepared in accordance with the present inventive concept. These examples are not intended to limit the scope of the invention or the claims set forth herein.

EXAMPLE I

A black ink formulation in accordance with the invention comprises the following formula:

BLACK INK FORMULATION

| Component | Tradename/Source | Approximate % By Weight |
|---|---|---|
| Petroleum-Based Ink Solvent (hydro-treated 52A Oil) | Magiesol 52 Oil; Magie Brothers Oil Co., Franklyn Park, Illinois | 33.70% |
| Modified Hydrocarbon Resin (average molecular weight about 950) | 1420 Resin; Nevile Chemical Co., Pittsburgh, PA | 10.50% |
| Modified Hydrocarbon Resin (average molecular weight 20,000–35,000) | HSLM Resin; Resinol Corp. Hattiesburg, MS | 8.50% |
| Petroleum-Process Oil | Telura 797; Exxon Chemical Corp. Houston, TX | 4.50% |
| Oil-Based Carbon Black | ELFEX 115; Cabot Corp., Cabot, LA | 17.55% |
| Aluminum Gellant | Cyclogel; Chattem Chemical, Chattanooga, TN | .63% |
| Naphthenic Ink Oil (1-1200 Oil) | Hyprint L-1200; Ergon Refining, Vicksburg, Miss. | 24.55% |
| Triethanolamine (TEA) | Union Carbide Corp. Princeton, NJ | 0.07% |

The above-set-forth formulation is prepared by blending all components in a single vessel.

The percentages set forth in the above example provide an ink formulation which is usable in many (lithographic) newspaper printing operations. However, it will be appreciated that adjustments in the viscosity range, tack and/or other properties of the ink may be achieved by altering the relative amount(s) of some or all of the formulation components. Such adjustments may render the composition usable in applications other than newspaper printing.

Relatively small variations in the amount of triethanolamine contained in the ink composition of Example I have been found to cause substantial corresponding variations in the rheological properties of the ink. For example, Table A contains shear rate versus viscosity values for ink compositions containing all the ingredients set forth in Example I, but wherein the concentration of TEA has been varied from 0% to 5% by weight. The viscosity values set forth in Table A were measured at 37° C. using a Brookfield viscosimeter fitted with a CP-52 spindle.

TABLE A

| RPM | Shear Rate (sec$^{-1}$) | Shear Stress (dynes/cm$^2$) | Brookfield Viscosity (CPS) |
|---|---|---|---|
| Sample A (0.0% TEA) | | | |
| 0.5 | 1 | 0.71841 | 71.841 |
| 1.0 | 2 | 0.99472 | 49.736 |
| 2.5 | 5 | 1.4644 | 29.289 |
| 5.0 | 10 | 1.7960 | 17.960 |
| 10 | 20 | 2.3763 | 11.881 |
| 20 | 40 | 3.3986 | 8.4966 |
| 50 | 100 | 5.2499 | 5.2499 |
| 100 | 200 | 7.4604 | 3.7302 |
| Sample B (0.5% TEA) | | | |
| 0.5 | 1 | 0.69078 | 69.078 |
| 1.0 | 2 | 0.93946 | 46.973 |
| 2.5 | 5 | 1.5750 | 31.499 |
| 5.0 | 10 | 1.8789 | 18.789 |
| 10 | 20 | 2.5697 | 12.848 |
| 20 | 40 | 3.6473 | 9.1183 |
| 50 | 100 | 5.8025 | 5.8025 |
| 100 | 200 | 8.2064 | 4.1032 |
| Sample C (1.0% TEA) | | | |
| 0.5 | 1 | 1.4368 | 143.68 |
| 1.0 | 2 | 1.9065 | 95.327 |
| 2.5 | 5 | 2.9842 | 59.683 |
| 5.0 | 10 | 3.5920 | 35.920 |
| 10 | 20 | 4.4486 | 22.243 |
| 20 | 40 | 5.3881 | 13.470 |
| 50 | 100 | 8.3170 | 8.3170 |
| 100 | 200 | 11.218 | 5.6091 |
| Sample D (1.5% TEA) | | | |
| 0.5 | 1 | 1.6302 | 163.02 |
| 1.0 | 2 | 1.8513 | 92.564 |
| 2.5 | 5 | 2.3763 | 47.525 |
| 5.0 | 10 | 2.7907 | 27.907 |
| 10 | 20 | 3.2328 | 16.164 |
| 20 | 40 | 4.2828 | 10.707 |
| 50 | 100 | 7.3222 | 7.3222 |
| 100 | 200 | 10.223 | 5.1117 |
| Sample E (2.0% TEA) | | | |
| 0.5 | 1 | 1.2158 | 121.58 |
| 1.0 | 2 | 1.3539 | 67.696 |
| 2.5 | 5 | 1.5197 | 30.394 |
| 5.0 | 10 | 1.575 | 15.750 |
| 10 | 20 | 1.9342 | 9.6709 |
| 20 | 40 | 2.6802 | 6.7005 |
| 50 | 100 | 4.1999 | 4.1994 |
| 100 | 200 | 5.8025 | 2.9013 |

The foregoing tabular data evidences and illustrate the highly desirable thixotropic properties obtained when the amount of TEA contained in the ink formulation of Example I is varied between 0.5 and 2.0% by weight. Based on these data, thixotropic properties suitable for most newspaper printing applications are obtained when TEA is included in the formulation at approximately 0.7% by weight.

EXAMPLE II

A red ink formulation in accordance with the invention comprises:

RED INK FORMULATION

| Component | Source | % By Weight |
|---|---|---|
| A: Heatset Varnish (IC34) | HSLM Camel; The Ink Co., Sacramento, CA | 35% |
| B: Gelled Ink Oil (IC31) | BOSO; The Ink Co., Sacramento, CA | 5% |
| C: Rubine Ink Base | DBE Rubine; The Ink Co., Tampa, Florida | 20% |
| D: Red Pigment Composition | Red Lake C; Magruder Color Co., Elizabeth, NJ | 2% |
| E: Naphthenic Ink Oil (1-1200 Oil) | High Print L1200; Ergon Refining Co., Vicksburg, Miss. | 32% |

-continued

RED INK FORMULATION

| Component | Source | % By Weight |
|---|---|---|
| F: Triethanolamine | 99%, Union Carbide | 2% |
| G. Petroluem Hydro-Carbon Oil (Hydro-Treated 52-A Oil) | Magiesol 52 Oil; Magie Brothers Oil Co., Franklyn Park, Ill. | 4% |

The red ink formulation set forth in Example II is prepared by initially combining 35% heatset varnish (IC34) (component A), 5% gelled ink oil (component B), 20% rubine ink base (component C), and 2% red pigment composition (component D) in a single vessel, and mixing at room temperature until a substantially homogenous and even consistency is achieved. Thereafter, a first aliquot or portion (18%) of the naphthenic ink oil (component E) is added to the vessel and the vessel contents are mixed until uniformity and homogeneity have been achieved. Thereafter, the remainder (14%) of the naphthinic ink oil (component E), 2% triethanolamine (compound F), and 4% 52A oil (compound G) are added under continued mixing. The TEA may be added at room temperature. It is not necessary to heat the composition in order to obtain the desired thixotropic effects of TEA. However, it will be appreciated that the other components of the formulations are generally blended at elevated manufacturing temperatures of approximately 200° C. Thus, to facilitate processing, the TEA may be added while the formulation is at such elevated temperature.

EXAMPLE III

A primarily resin-based ink formulation in accordance with the invention comprises:

| Component | Source | % By Weight |
|---|---|---|
| A: Heatset Varnish (IC34) | HSLM Camel; The Ink Co., Sacramento, CA | 35.5% |
| B: Rubine Ink Base | DBE Rubine; The Ink Co., Tampa, FL | 39.0% |
| C: Printing Ink Wax Compound | L-386 Wax, Dyall Products, Franklin Park, IL | 7.0% |
| D: Petroleum Based Ink Solvent (hydro-treated 52A Oil) | Magiesol 52 Oil; Magie Brothers Oil Co., Franklyn Park, IL | 15.5% |
| E: Triethanolamine (99%) | Union Carbide Corp., Princeton, NJ | 2.0% |
| F: Polymarized Castor Oil | H-2 Out CPS; Buffalo, NY | 0.5% |

The red ink formulation of Example III is prepared by initially combining the Heatset Varnish (component A) and the Rubine Ink Base (component B) and mixing until smooth. Thereafter, the remaining ingredients (components C through G) are added slowly, under mixing. The TEA may be added at room temperature. It is not necessary to heat the composition in order to obtain the desired thixotropic effects of TEA. However, it will be appreciated that the other components of the formulations are generally blended at elevated manufacturing temperatures of approximately 200° C. Thus, to facilitate processing, the TEA may be added while the formulation is at such elevated temperature.

EXAMPLE IV

A primarily oil-based ink composition of the present invention comprises:

| Component | Source | % By Weight |
|---|---|---|
| A: Naphthenic Ink Oil (1-1200 Oil) | Hyprint L-1200; Ergon Refining, Vicksburg, Miss. | 73.0% |
| B: Oil-Based Carbon Black | ELFEX 115; Cabot Corp., Cabot, LA | 20.21% |
| C: Petroleum-Process Oil | Telura 797; Exxon Chemical Corp., Houston, Texas | 6.1% |
| D: Triethanolamine (99%) | Union Carbide Corp., Princeton, NJ | 0.55% |

The black ink formulation of Example IV is prepared by initially combining the naphthenic ink oil (component A), the oil-based carbon black (component B), and the petroleum-process oil (component C) and blending such combined components until a homogenous mixture is attained. Thereafter, the triethanolamine (TEA) (component D) is added under mixing. The TEA may be added at room temperature. It is not necessary to heat the composition in order to obtain the desired thixotropic effects of TEA. However, it will be appreciated that the other components of the formulations are generally blended at elevated manufacturing temperatures of approximately 200° C. Thus, to facilitate processing, the TEA may be added while the formulation is at such elevated temperature.

Having described the present invention with specific reference to the foregoing examples, it will be obvious to those skilled in the art that various additions, deletions, and modifications may be made to the exemplary formulations without departing from the spirit and scope of the invention. Accordingly, such additions, deletions, and modifications are not to be regarded as departures from the spirit and scope of the present invention, but rather are intended to be included within the scope of the following claims and the equivalents thereof.

What is claimed is:

1. An ink composition comprising:
   (a) approx. 33.7% by weight of solvent petroleum-based ink solvent
   (b) approx. 24.5% by weight of naphthenic ink oil
   (c) approx. 19.0% by weight of hydrocarbon resin(s)
   (d) approx. 4.5% by weight of petroleum-process oil
   (e) approx. 17.5% by weight of oil-based carbon black
   (f) less than 1% by weight of aluminum gellant
   (g) approximately 0.07% to 1.5% by weight of triethanolamine.

2. The ink composition of claim 1 wherein said hydrocarbon resin(s) comprises a combination of at least two hydrocarbon resins, the relative amounts of said at least two hydrocarbon resins being such that the final ink composition will exhibit hydroscopicity in the range of 40% to 60% by weight.

3. An ink composition comprising:
   (a) approx. 33.70% by weight of petroleum-based ink solvent
   (b) approx. 24.55% by weight of naphthenic ink oil (c) approx. 10.50% by Weight of a first hydrocarbon resin having an average molecular weight of approximately 950 gm/mol
(d) approx. 8.50% by weight of a second hydrocarbon resin having an average molecular weight of approximately 20,000-35,000 gm/mol
(e) approx. 4.50% by weight of petroleum-process oil
(f) approx. 17.55% by weight of oil-based carbon black
(g) approx. 0.63% by weight of aluminum gellant
(h) approx. 0.07% by weight of triethanolamine.

4. The ink composition of claim 3 wherein said naphthenic ink oil is characterized in that approximately 12% of the carbon atoms of said naphthenic ink oil are aromatic, approximately 40% of the carbon atoms of said naphthenic ink oil are naphthenic, and approximately 48% of the carbon atoms of said naphthenic ink oil are paraffinic.

5. The ink composition of claim 4 wherein said naphthenic ink oil has an average molecular weight of approximately 442 gm/mol.

6. An ink composition comprising:
(a) approx. 35% by weight of heat set varnish
(b) approx. 32% by weight of naphthenic ink oil
(c) approx. 20% by weight of Rubine ink base
(d) approx. 5% by weight of gelled ink oil
(e) approx. 4% by weight of petroleum hydrocarbon oil
(f) approx. 2% by weight of red pigment composition
(g) approx. 2% by weight of triethanolamine.

7. The ink composition of claim 6 wherein said naphthenic ink oil is characterized in that approximately 12% of the carbon atoms of said naphthenic ink oil are aromatic, approximately 40% of the carbon atoms of said naphthenic ink oil are naphthenic, and approximately 48% of the carbon atoms of said naphthenic ink oil are paraffinic.

8. The ink composition of claim 6 wherein said naphthenic ink oil has an average molecular weight of approximately 442 gm/mol.

9. An ink composition comprising:
(a) approx. 73% by weight of naphthenic ink oil
(b) approx. 20.21% by weight of oil-based carbon black
(c) approx. 6.1% by weight of petroleum process oil
(d) approx. 0.55% by weight of triethanolamine.

10. The ink composition of claim 9 wherein said naphthenic ink oil has an average molecular weight of approximately 442 gm/mol.

11. The ink composition of claim 9 wherein approximately 12% of the carbon atoms of said naphthenic ink oil are aromatic, approximately 40% of the carbon atoms of said naphthenic ink oil are naphthenic, and approximately 48% of the carbon atoms of said naphthenic ink oil are paraffinic.

12. An ink composition comprising:
(a) approx. 35.5% by weight of heat set varnish
(b) approx. 39% by weight of Rubine ink base
(c) approx. 7% by weight of printing ink wax compound
(d) approx. 15% by weight of petroleum-based ink solvent
(e) approx. 2% by weight of triethanolamine
(f) approx. 0.5% by weight of polymerized castor oil.

13. A method of imparting thixotropic properties to printing ink compositions containing at least one organic ink vehicle, said method comprising the step of blending at least one ethanolamine compound into said printing ink to obtain a final printing ink material exhibiting thixotropic properties.

14. The method of claim 13 wherein the step of "blending a sufficient amount of at least one ethanolamine compound" comprises blending a sufficient amount of at least one compound selected from the group consisting of:
(a) monoethanolamine;
(b) diethanolamine;
(c) triethanolamine; and
(d) combinations thereof.

15. The method of claim 13 wherein the step of "blending at least one ethanolamine compound" comprises blending approximately 0.5 to 2.0 percent by weight triethanolamine into the printing ink composition.

16. The method of claim 13 wherein the step of "blending at least one ethanolamine compound" comprises blending approximately 0.7 percent by weight triethanolamine into the printing ink composition.

17. A method of improving the rub resistance of an applied printing ink, said method comprising the step of adding at least one ethanolamine compound to said printing ink prior to application thereof.

18. The method of claim 17 wherein the step of adding at least one ethanolamine compound to the printing ink comprises adding at least one ethanolamine compound selected from the group consisting of:
(a) monoethanolamine;
(b) diethanolamine;
(c) triethanolamine; and
(d) combinations thereof.

* * * * *